United States Patent
Lu

(10) Patent No.: US 11,047,775 B2
(45) Date of Patent: Jun. 29, 2021

(54) PARAFFIN DISTRIBUTION DEVICE FOR EMBEDDER AND EMBEDDER WITH THE SAME

(71) Applicant: LEICA MICROSYSTEMS LTD., SHANGHAI, Shanghai (CN)

(72) Inventor: Yu Lu, Shanghai (CN)

(73) Assignee: Leica Microsystems Ltd., Shanghai, Shanghai (CN)

( * ) Notice: Subject to any disclaimer, the term of this patent is extended or adjusted under 35 U.S.C. 154(b) by 515 days.

(21) Appl. No.: 15/755,069

(22) PCT Filed: Aug. 1, 2016

(86) PCT No.: PCT/CN2016/092754
§ 371 (c)(1),
(2) Date: Feb. 24, 2018

(87) PCT Pub. No.: WO2017/032208
PCT Pub. Date: Mar. 2, 2017

(65) Prior Publication Data
US 2018/0246019 A1    Aug. 30, 2018

(30) Foreign Application Priority Data
Aug. 26, 2015   (CN) .......................... 201510531241.3

(51) Int. Cl.
*G01N 1/36* (2006.01)
*G01N 1/44* (2006.01)
(Continued)

(52) U.S. Cl.
CPC ................. *G01N 1/36* (2013.01); *G01N 1/44* (2013.01); *G01N 35/1011* (2013.01); *G01N 2035/0406* (2013.01)

(58) Field of Classification Search
CPC ............ G01N 1/36; G01N 2035/00425; Y10T 436/2575
(Continued)

(56) References Cited

U.S. PATENT DOCUMENTS 3,614,389 A * 10/1971 Malisza ............. A61C 13/0028
                                                            219/421
4,483,270 A    11/1984 Toya et al.
(Continued)

FOREIGN PATENT DOCUMENTS

CN          1425851 A      6/2003
CN        102382312 A      3/2012
(Continued)

OTHER PUBLICATIONS

JP2002318177A translation (Year: 2002).*
(Continued)

*Primary Examiner* — Tyrone V Hall, Jr.
*Assistant Examiner* — Abbie E Quann
(74) *Attorney, Agent, or Firm* — Hodgson Russ LLP

(57) ABSTRACT

The present invention relates to a paraffin distribution device for an embedder, and an embedder with the same. The paraffin distribution device includes a distribution tube having a first end and a second end; a flow valve disposed on the distribution tube; a paraffin outlet member having a paraffin distribution outlet and connected to the first end of the distribution tube; and a heating strip stuck to the distribution tube, the flow valve and the paraffin outlet member. The present invention can accomplish uniform heating of the distribution tube, the flow valve and the paraffin outlet member, and uniform heat transfer.

19 Claims, 2 Drawing Sheets

(51) Int. Cl.
*G01N 35/10* (2006.01)
*G01N 35/04* (2006.01)

(58) Field of Classification Search
USPC .......................................................... 210/446
See application file for complete search history.

(56) References Cited

U.S. PATENT DOCUMENTS

| | | |
|---|---|---|
| 7,722,810 B2 | 5/2010 | Allen et al. |
| 8,034,292 B2 | 10/2011 | Allen et al. |
| 8,734,735 B2 | 5/2014 | Williamson, IV et al. |
| 8,999,270 B2 | 4/2015 | Williamson, IV et al. |
| 9,194,779 B2 | 11/2015 | Williamson, IV et al. |
| 2005/0226770 A1 | 10/2005 | Allen et al. |
| 2008/0081363 A1 | 4/2008 | Hutchins et al. |
| 2010/0129859 A1 | 5/2010 | Allen et al. |
| 2011/0165616 A1 | 7/2011 | Fischer |
| 2011/0182783 A1 | 7/2011 | Williamson, IV et al. |
| 2014/0255986 A1 | 9/2014 | Williamson, IV et al. |
| 2015/0198509 A1 | 7/2015 | Williamson, IV et al. |

FOREIGN PATENT DOCUMENTS

| | | | |
|---|---|---|---|
| CN | 104048871 A | | 9/2014 |
| CN | 104324668 A | | 2/2015 |
| CN | 204225972 | | 3/2015 |
| FR | 2391463 | | 12/1978 |
| GB | 1230913 A | | 5/1971 |
| JP | H07506524 | | 7/1995 |
| JP | 2002318177 | | 10/2002 |
| JP | 2002318177 A | * | 10/2002 |
| WO | 2004029584 | | 4/2004 |

OTHER PUBLICATIONS

JPO, Office Action for JP Application No. 2018510752, dated Feb. 27, 2019.
Li et al., "Discussion on the installation method of satellite pipeline heating belt," Spacecraft Environment Engineering, vol. 25, No. 4, Aug. 2008, pp. 384-386.
SIPO, First Office Action for CN Application No. 201510531241.3, dated Dec. 31, 2019.
EPO, Office Action for EP Application No. 16838468, dated Sep. 26, 2018.

* cited by examiner

PARAFFIN DISTRIBUTION DEVICE FOR EMBEDDER AND EMBEDDER WITH THE SAME

CROSS-REFERENCE TO RELATED APPLICATIONS

The present application is a national phase entry under 35 USC § 371 of International Application PCT/CN2016/092754, filed on Aug. 1, 2016, which claims the benefit of and priority to Chinese Patent Application No. 201510531241.3, filed on Aug. 26, 2015, the entire disclosures of which are incorporated herein by reference.

FIELD

The present invention relates to a technical field of an embedder for embedding specimens in paraffin, and more particularly to a paraffin distribution device for an embedder. Moreover, the present invention further relates to an embedder with the paraffin distribution device.

BACKGROUND

An embedder is a device for embedding specimens in paraffin. The melted paraffin is transferred from a heatable paraffin container to a cassette by a paraffin distribution device to embed specimens. The paraffin distribution device usually includes a distribution tube, a flow valve disposed on the distribution tube, and a paraffin outlet member connected to an end of the distribution tube. In order to avoid blockage caused by solidification of the paraffin, the paraffin distribution device is winded by a heating wire or a heating strip for heating. However, it is difficult to wind the heating wire around the paraffin distribution device, and more difficult to wind it uniformly, which may affect uniformity of heating the paraffin distribution device. In addition, due to a large volume of the flow valve, an independent heating element needs to be disposed to heat the flow valve, thereby resulting in high cost. Moreover, if the temperature is too low in one position of the paraffin distribution device, the paraffin will be solidified and thus cannot flow; if the temperature is too high in one position of the paraffin distribution device, the paraffin will be decomposed and thus cannot be used. Therefore, improvement to the paraffin distribution device in the related art is desired.

SUMMARY

The present invention aims to solve at least one of the problems existing in the related art.

Thus, embodiments of the present invention provide a paraffin distribution device for an embedder. The paraffin distribution device includes a distribution tube having a first end and a second end; a flow valve disposed on the distribution tube; a paraffin outlet member having a paraffin distribution outlet and connected to the first end of the distribution tube; a heating strip stuck to the distribution tube, the flow valve and the paraffin outlet member.

According to the embodiments of the present invention, the heating strip is stuck to the distribution tube, the flow valve and the paraffin outlet member, so as to accomplish uniform heating of the distribution tube, the flow valve and the paraffin outlet member, and uniform heat transfer. Moreover, in the same case, it is unnecessary to wind up the heating strip, which is simple to manufacture with low cost.

Alternatively, the flow valve includes a valve body, an inlet tube and an outlet tube; the valve body includes an outlet and an inlet; the inlet tube has a first end connected with the inlet and a second end connected with the distribution tube; the outlet tube has a first end connected with the outlet and a second end connected with the distribution tube. Such a configuration makes the connection between the flow valve and the distribution tube simple.

Alternatively, an axis of the outlet tube and an axis of the inlet tube share a common line, so as to facilitate the flowing of paraffin.

Alternatively, the paraffin distribution device further includes a thermal pad disposed between the flow valve and the heating strip, and stuck to an outer surface of the flow valve and the heating strip, so as to transfer heat generated by the heating strip to the flow valve uniformly. The thermal pad is disposed between the flow valve and the heating strip, so as to make heat transfer between the flow valve and the heating strip uniform and to make sure the heat not concentrate in one position.

Alternatively, the paraffin distribution device further includes a silicon belt that is winded around the distribution tube to keep the heating strip to be closely stuck to a surface of the distribution tube, so as to further make the heat transfer uniform.

Alternatively, the paraffin outlet member includes a mounting hole provided with a temperature sensor that is configured to detect a temperature of the paraffin in the paraffin outlet member to control heating power of the heating strip according to the temperature of the paraffin. Since the temperature in the paraffin outlet member is more important than that in other positions, the temperature sensor is disposed in the paraffin outlet member, such that the temperature sensor can detect the temperature in the paraffin outlet member accurately to avoid high or low temperature in the paraffin outlet member.

Alternatively, a first portion of the heating strip stuck to the paraffin outlet member has a first heating power greater than other portions of the heating strip, so as to prevent the paraffin from cooling during distribution.

Alternatively, a second portion of the heating strip stuck to the flow valve has a second heating power greater than a third portion of the heating strip stuck to the distribution tube, so as to make the paraffin pass through smoothly and to measure the flow of the paraffin accurately.

Alternatively, the heating strip includes an outer insulative layer, an inner heating element embedded in the outer insulative layer, and an adhesive layer disposed at an outer surface of the outer insulative layer; the heating strip is stuck to the distribution tube, the flow valve and the paraffin outlet member via the adhesive layer.

Alternatively, the outer insulative layer of the heating strip is polyimide, and the inner heating element is a resistance wire or resistance sheet.

Alternatively, the heating strip extends along an axial direction of the distribution tube, so as to facilitate the installation of the heating strip and to heat the distribution tube more uniformly.

Alternatively, the heating strip includes the adhesive layer via which the heating strip is stuck to the distribution tube, the flow valve and the paraffin outlet member, so as to realization the fixation of the heating strip with the distribution tube and the fixation of the flow valve with the paraffin outlet member in a simple manner.

The embodiments of the present invention further provide an embedder. The embedder includes a body having a paraffin container for containing the paraffin, and a paraffin distribution device as described above, the second end of the distribution tube of the paraffin distribution device connected with the paraffin container.

Figure 1:
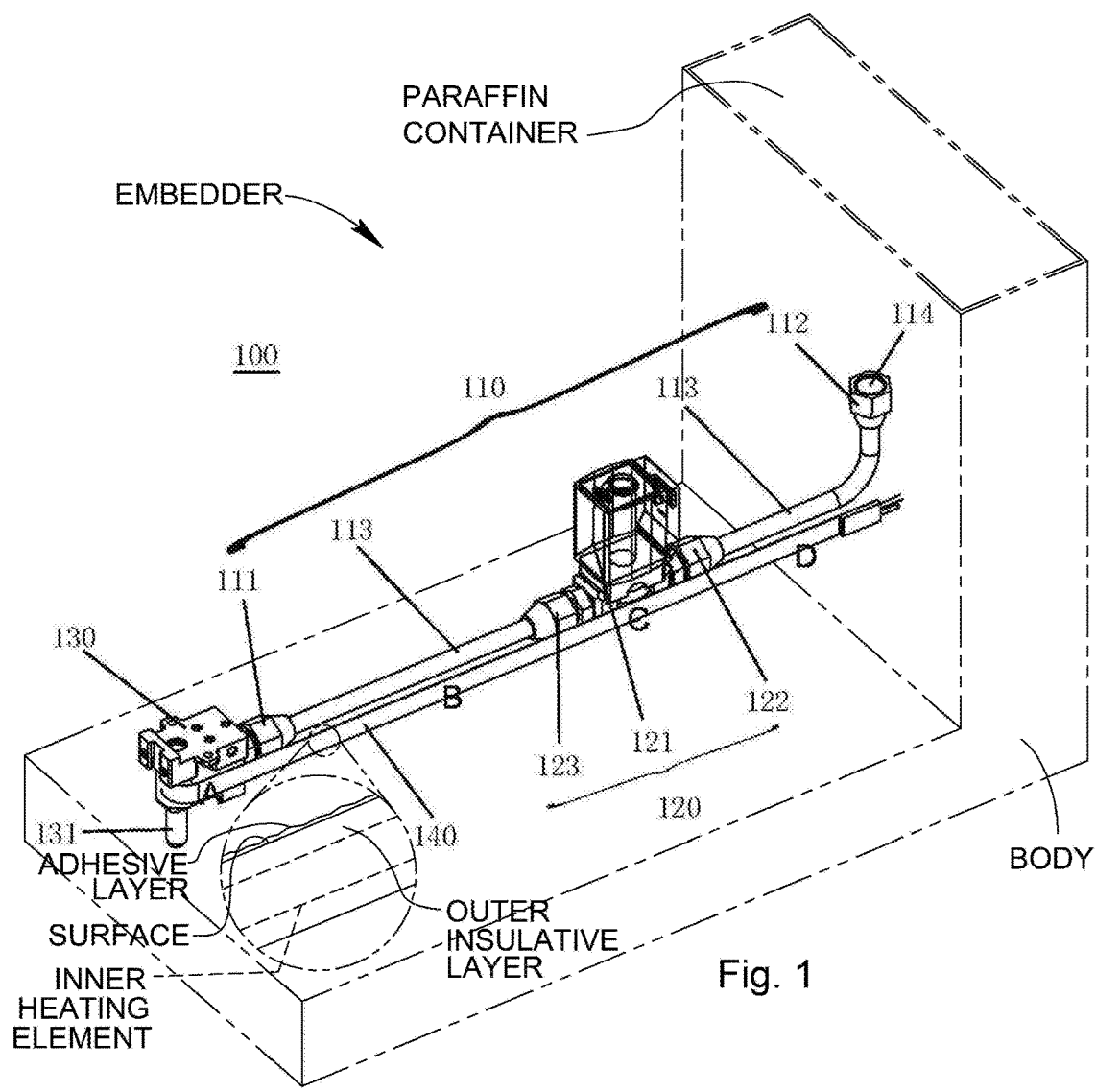
FIG. 1 is a schematic view of a paraffin distribution device for an embedder according to an embodiment of the present invention.

REFERENCE NUMERALS 100 paraffin distribution device
110 distribution tube
120 flow valve
130 paraffin outlet member
140 heating strip
111 first end
112 second end
113 tube body
114 opening
121 valve body
122 inlet tube
123 outlet tube
131 paraffin distribution outlet
132 mounting hole
133 temperature sensor
134 cushion
135 screw
150 thermal pad
160 silicon belt

DETAILED DESCRIPTION

Embodiments of the present invention will be described in detail and examples of the embodiments will be illustrated in the accompanying drawings. The embodiments described herein with reference to the drawings are explanatory, which aim to illustrate the present invention, but shall not be construed to limit the present invention.

In the specification, it shall be understood that terms such as "upper," "lower," "left," and "right" are explanatory, for convenience of description and interpretation of the present invention, and thus shall not be construed to limit the present invention.

In the following, a paraffin distribution device for an embedder according to the embodiments of the present invention will be illustrated with reference to drawings.

As shown in FIG. 1 to FIG. 4, the paraffin distribution device 100 according to the embodiments of the present invention includes a distribution tube, a flow valve, a paraffin outlet member and a heating strip.

The distribution tube consists of a first end and a second end, and the flow valve is disposed on the distribution tube. The paraffin outlet member has a paraffin distribution outlet and connected to the first end of the distribution tube, and the heating strip is stuck to the distribution tube, the flow valve and the paraffin outlet member.

It shall be understood that the term "stuck" in the specification refers to that the heating strip directly or indirectly contacts with the distribution tube, the flow valve and the paraffin outlet member, and the heating strip can extend linearly or extend spirally on the distribution tube for no more than one round. In the related art, the heating wire is winded upon the paraffin distribution device, which refers to that the heating wire is winded and fixed upon the paraffin distribution device for more than one round. In addition, as shown in FIG. 1, the heating strip extends linearly, which refers to that an end of the heating strip adjacent to the paraffin outlet member may extend for a certain length around a peripheral surface of the paraffin outlet member. For example, the end of the heating strip adjacent to the paraffin outlet member is configured as a U shape to enclose at least a part of the peripheral surface of the paraffin outlet member, which belongs to the proper meaning of the term "stuck".

According to the embodiments of the present invention, the heating strip is stuck to the distribution tube, the flow valve and the paraffin outlet member, so as to make heat transfer uniform and to heat the distribution tube, the flow valve and the paraffin outlet member uniformly. Moreover, it is unnecessary to wind up the heating strip, which results in simple manufacturing and low cost.

In the following, the paraffin distribution device according to specific embodiments of the present invention will be described.

Figure 2:
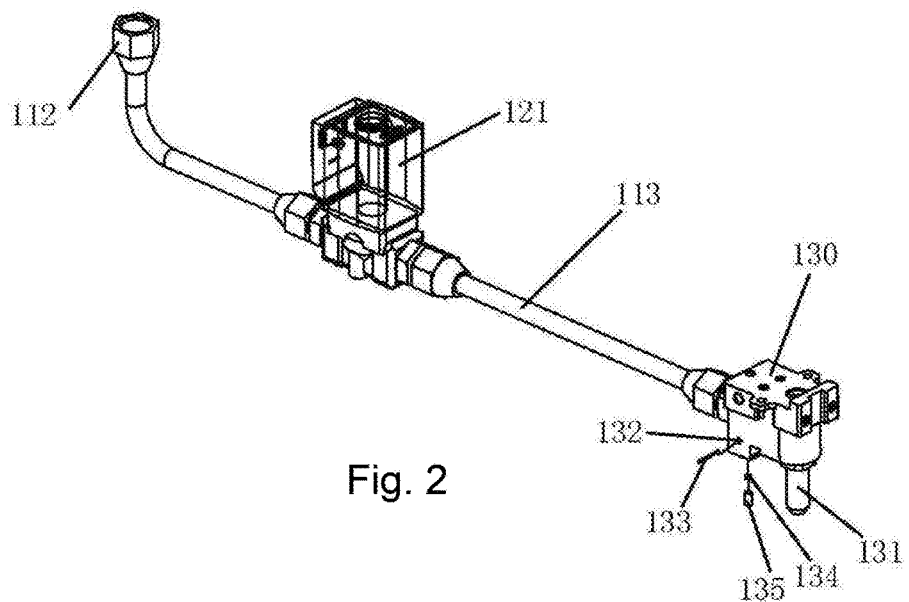
FIG. 2 is a schematic view of a paraffin distribution device for an embedder according to another embodiment of the present invention.

As shown in FIG. 1 and FIG. 2, the paraffin distribution device 100 according to some specific embodiments of the present invention includes a distribution tube 110, a flow valve 120, a paraffin outlet member 130 and a heating strip 140. The distribution tube 110 consists of a first end 111 (a left end in FIG. 1), a second end 112 (a right end in FIG. 1) and a tube body 113. In the embodiments shown in FIG. 1 and FIG. 2, the tube body 113 is a circular tube, i.e. the tube body 113 has a circular cross section, but the present invention is not limited thereby. For example, the tube body 113 may have a cross section of other shapes, like a rectangular cross section.

The flow valve 120 is disposed on the distribution tube 110. For example, the flow valve 120 is disposed in the substantially middle of the distribution tube and close to a right end of the distribution tube. It shall be appreciated by those skilled in the art that the present invention does not particularly limit the installation position of the flow valve.

The flow valve 120 includes a valve body 121, an inlet tube 122 and an outlet tube 123. The valve body 121 includes an outlet and an inlet (not shown); the inlet tube 122 has a first end (a right end in FIG. 1) connected with the inlet and a second end (a left end in FIG. 1) connected with the tube body 113 of the distribution tube 110.

The outlet tube 123 has a first end (a left end in FIG. 1) connected with the outlet and a second end (a right end in FIG. 1) connected with the tube body 113 of the distribution tube 110. In the embodiment, an axis of the outlet tube 123 and that of the inlet tube 122 share a common line. However, it can be understood by those skilled in the art that the axis of the outlet tube 123 and that of the inlet tube 122 may not share a common line.

The paraffin outlet member 130 is connected to the first end 111 of the distribution tube 110, and has a paraffin distribution outlet 131 (distribution tube nozzle) for distributing the paraffin. In the embodiment, the paraffin distribution outlet 131 has an opening faces downwards, but the present invention is not limited thereby.

The paraffin is distributed from the paraffin outlet member 130, so the temperature of the paraffin in the paraffin outlet member may have a great effect on the effect of paraffin distribution. As shown in FIG. 2, in some embodiments, the paraffin outlet member 130 has a mounting hole 132 provided with a temperature sensor 133 that is configured to detect the temperature of the paraffin in the paraffin outlet member 130 to control heating power of the heating strip according to the temperature of the paraffin. Optionally, the temperature sensor 133 is disposed in the inside middle of the paraffin outlet member 130. Alternatively, the temperature sensor 133 is fixed within the mounting hole 132 by a cushion 134 and a screw 135. Thus, the temperature sensor 133 can detect the temperature of the paraffin in the paraffin outlet member 130, to prevent the temperature in the paraffin outlet member 130 from being too high and too low.

The heating strip 140 is stuck to the distribution tube 110, the flow valve 120 and the paraffin outlet member 130. Specifically, the heating strip 140 is disposed on the distribution tube 110, the flow valve 120 and the paraffin outlet member 130 in a sticking rather than winding manner. Optionally, as shown in FIG. 1, the heating strip 140 extends along an axial direction (a left-and-right direction) of the distribution tube 110, and is directly and closely stuck to the distribution tube 110, the flow valve 120 and the paraffin outlet member 130. Alternatively, the heating strip 140 can tilt for a certain angle with respect to the axial direction of the distribution tube 110, or can extend spirally around the axial direction of the distribution tube 110 for no more than one round.

As shown in FIG. 1, the heating strip 140 is stuck to the tube body 113 and the first end 111 of the distribution tube 110, the inlet tube 122 and the outlet tube 123 of the flow valve, and the paraffin outlet member 130. It can be appreciated by those skilled in the art that the left end of the heating strip 140 may enclose at least a part of the peripheral surface of the paraffin outlet member, for example, the left end of the heating strip 140 configured as a U shape.

In some embodiments of the present invention, as shown in FIG. 1, the heating strip 140 has different heating powers in four positions (A, B, C and D) of the distribution tube 110, the flow valve 120 and the paraffin outlet member 130, to make sure the temperature in each position uniform. The heating power of the heating strip 140 in different positions may be calculated according to the material and volume of the distribution tube 110, the flow valve 120 and the paraffin outlet member 130. Optionally, since the flow valve 120 and the paraffin outlet member 130 both have a relatively large volume, and the paraffin is distributed from the paraffin outlet member 130, a first portion of the heating strip 140 stuck to the paraffin outlet member 130 (i.e. located at position A) has a first heating power greater than other portions of the heating strip 140, so as to prevent the paraffin from being solidified and overheated during distribution; a second portion of the heating strip 140 stuck to the flow valve 120 (i.e. located at position C) has a second heating power greater than a third portion of the heating strip 140 stuck to the distribution tube (i.e. located at positions B and D) but less than the first portion of the heating strip 140 stuck to the paraffin outlet member 130. In this way, the paraffin can flow smoothly, with the flow thereof being measured accurately, so as to improve the distribution effect, and to avoid blockage due to solidification of the paraffin and to avoid overheating of the paraffin.

Additionally separate temperature sensors can be arranged in each of the four positions (A, B, C and D) to measure the temperature of the paraffin in each position. This individually measurement allows a separate regulation of the heating power in the four positions.

In some embodiments, the heating strip 140 uses Kapton (DuPont) heating strip with adhesive. Alternatively, the heating strip 140 may include an outer insulative layer, an inner heating element embedded in the outer insulative layer, and an adhesive layer disposed at an outer surface of the outer insulative layer; the heating strip 140 is stuck to the distribution tube 110, the flow valve 120 and the paraffin outlet member 130 via the adhesive layer, which is more simple to perform. Alternatively, the outer insulative layer of the heating strip 140 is polyimide, and the inner heating element is a resistance wire or resistance sheet. Consequently, the heating strip 140 is easy to manufacture.

In the following, the operation process of the paraffin distribution device 100 according to above embodiments of the present invention will be described briefly.

Melted Paraffin from a heatable paraffin container of an embedder enters the distribution tube 110 via an opening 114 of the second end 112, then passes through the flow valve 120 and is distributed outwards via the paraffin distribution outlet 131 of the paraffin outlet member 130, for example, distributed into a cassette. In the process of flowing, the heating strip 140 heats the paraffin to avoid blockage caused by the solidification of the paraffin.

Figure 3:
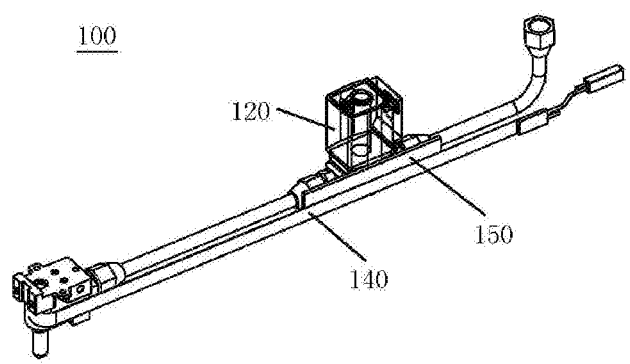
FIG. 3 is a sectional schematic view of a paraffin distribution device for an embedder according to another embodiment of the present invention.

In some embodiments, as shown in FIG. 3, the paraffin distribution device 100 further includes a thermal pad 150 disposed between the flow valve 120 and the heating strip 140, and stuck to an outer surface of the flow valve 120 and the heating strip 140, so as to transfer heat generated by the heating strip 140 to the flow valve 120 uniformly. In this embodiment, the thermal pad 150 is fitted with the outer surface of the flow valve 120 and the adhesive layer (not shown) of the heating strip 140 by sticking. The thermal pad 150 is disposed between the flow valve 120 and the heating strip 140, so as to make heat transfer between the flow valve 120 and the heating strip 140 uniform and to make sure the heat not concentrate in one position.

Figure 4:
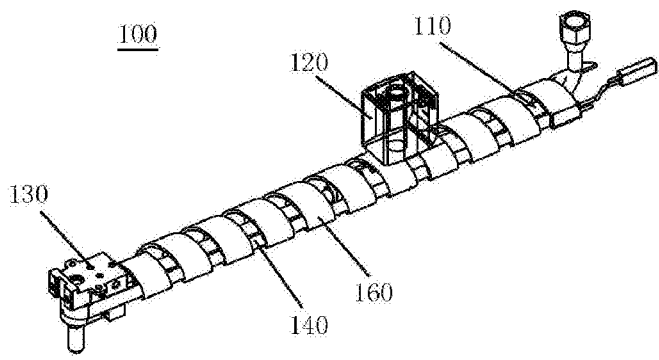
FIG. 4 is a schematic view of a paraffin distribution device for an embedder according to another embodiment of the present invention.

As shown in FIG. 4, in some embodiments, the paraffin distribution device 100 further includes a silicon belt 160 wound around the distribution tube 110 and the heating strip 140 to keep the heating strip 140 to be closely stuck to a surface of the distribution tube 110. In this embodiment, since the silicon belt 160 is wound around the heating strip 140, it makes sure that the heating strip 140 abuts against outer surfaces of the distribution tube 110, the flow valve 120 and the paraffin outlet member 130, so as to further guarantee uniform heat transfer.

The embedder according to the embodiments of the present invention includes a body and paraffin distribution device. The body has a paraffin container (not shown) for containing paraffin, and the paraffin distribution device may be the paraffin distribution device according to the above embodiments, with the second end of the distribution tube thereof connected with the paraffin container.

Reference throughout this specification to "an embodiment" or "an example" means that a particular feature, structure, material, or characteristic described in connection with the embodiment or example is included in at least one embodiment or example of the present invention. Thus, the appearances of the above phrases throughout this specification are not necessarily referring to the same embodiment or example of the present invention. Furthermore, the particular features, structures, materials, or characteristics may be combined in any suitable manner in one or more embodiments or examples. Those skilled in the art can integrate and combine different embodiments or examples and the features in different embodiments or examples in the specification.

What is claimed is:

1. A paraffin distribution device for an embedder, comprising:
   a distribution tube having a first end and a second end;
   a flow valve disposed on the distribution tube;
   a paraffin outlet member having a paraffin distribution outlet and connected to the first end of the distribution tube; and
   a heating strip stuck to the distribution tube, the flow valve and the paraffin outlet member respectively,
   wherein a first portion of the heating strip stuck to the paraffin outlet member has a first heating power greater than that of other portions of the heating strip.

2. The paraffin distribution device according to claim 1, wherein the flow valve comprises:
   a valve body comprising an outlet and an inlet,
   an inlet tube having a first end connected with the inlet and a second end connected with the distribution tube,
   an outlet tube having a first end connected with the outlet and a second end connected with the distribution tube.

3. The paraffin distribution device according to claim 2, wherein the outlet tube is coaxial with the inlet tube.

4. The paraffin distribution device according to claim 1, further comprising a thermal pad disposed between the flow valve and the heating strip to transfer heat generated by the heating strip to the flow valve uniformly.

5. The paraffin distribution device according to claim 1, further comprising a silicon belt wound around the heating strip and the distribution tube to keep the heating strip to be closely stuck to a surface of the distribution tube.

6. The paraffin distribution device according to claim 1, wherein the paraffin outlet member comprises a mounting hole within which a temperature sensor for detecting a temperature of paraffin in the paraffin outlet member is disposed.

7. The paraffin distribution device according to claim 1, wherein a second portion of the heating strip stuck to the flow valve has a second heating power greater than that of a third portion of the heating strip stuck to the distribution tube.

8. The paraffin distribution device according to claim 1, wherein the heating strip comprises an outer insulative layer, an inner heating element embedded in the outer insulative layer, and an adhesive layer disposed at an outer surface of the outer insulative layer,
   wherein the heating strip is stuck to the distribution tube, the flow valve and the paraffin outlet member via the adhesive layer.

9. The paraffin distribution device according to claim 8, wherein the outer insulative layer of the heating strip is made of polyimide, and the inner heating element is made of a resistance wire or resistance sheet.

10. The paraffin distribution device according to claim 1, wherein the heating strip extends along an axial direction of the distribution tube.

11. The paraffin distribution device according to claim 1, wherein the heating strip comprises the adhesive layer via which the heating strip is stuck to the distribution tube, the flow valve and the paraffin outlet member.

12. The paraffin distribution device according to claim 2, further comprising a thermal pad disposed between the flow valve and the heating strip to transfer heat generated by the heating strip to the flow valve uniformly.

13. The paraffin distribution device according to claim 3, further comprising a thermal pad disposed between the flow valve and the heating strip to transfer heat generated by the heating strip to the flow valve uniformly.

14. The paraffin distribution device according to claim 2, further comprising a silicon belt wound around the heating strip and the distribution tube to keep the heating strip to be closely stuck to a surface of the distribution tube.

15. The paraffin distribution device according to claim 3, further comprising a silicon belt wound around the heating strip and the distribution tube to keep the heating strip to be closely stuck to a surface of the distribution tube.

16. The paraffin distribution device according to claim 2, wherein the paraffin outlet member comprises a mounting hole within which a temperature sensor for detecting a temperature of paraffin in the paraffin outlet member is disposed.

17. The paraffin distribution device according to claim 2, wherein the heating strip comprises an outer insulative layer, an inner heating element embedded in the outer insulative layer, and an adhesive layer disposed at an outer surface of the outer insulative layer, wherein the heating strip is stuck to the distribution tube, the flow valve and the paraffin outlet member via the adhesive layer.

18. A paraffin distribution device for an embedder, comprising:
   a distribution tube having a first end and a second end;
   a flow valve disposed on the distribution tube;
   a paraffin outlet member having a paraffin distribution outlet and connected to the first end of the distribution tube; and
   a heating strip stuck to the distribution tube, the flow valve and the paraffin outlet member respectively,
   wherein the flow valve comprises: a valve body comprising an outlet and an inlet, an inlet tube having a first end connected with the inlet and a second end connected with the distribution tube, and an outlet tube having a first end connected with the outlet and a second end connected with the distribution tube,
   wherein a first portion of the heating strip stuck to the paraffin outlet member has a first heating power greater than that of other portions of the heating strip.

19. An embedder, comprising:
   a body having a paraffin container for containing paraffin, and
   a paraffin distribution device, the paraffin distribution device comprising:
      a distribution tube having a first end and a second end connected with the paraffin container;
      a flow valve disposed on the distribution tube;
      a paraffin outlet member having a paraffin distribution outlet and connected to the first end of the distribution tube; and
      a heating strip stuck to the distribution tube, the flow valve and the paraffin outlet member respectively,
      wherein a first portion of the heating strip stuck to the paraffin outlet member has a first heating power greater than that of other portions of the heating strip.

* * * * *